United States Patent [19]
Giorgetti

[11] Patent Number: 6,152,270
[45] Date of Patent: *Nov. 28, 2000

[54] DISC FOR A DISC BRAKE FOR VEHICLES IN GENERAL AND FOR HIGH-PERFORMANCE CARS IN PARTICULAR

[75] Inventor: Alberto Giorgetti, Terno d'Isola, Italy

[73] Assignee: Brembo S.p.A., Curno, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/870,842

[22] Filed: Jun. 5, 1997

Related U.S. Application Data

[63] Continuation of application No. 08/320,953, Oct. 12, 1994, abandoned.

[30] Foreign Application Priority Data

Oct. 18, 1993 [IT] Italy ............................. MI93U000794

[51] Int. Cl.⁷ ...................................... F16D 65/10
[52] U.S. Cl. .................................. 188/218 XL; 188/18 A
[58] Field of Search .......................... 188/18 A, 218 XL; 29/894.324, 894.321, 894.36, 894.361

[56] References Cited

U.S. PATENT DOCUMENTS

| | | | |
|---|---|---|---|
| 2,255,024 | 9/1941 | Eksergian | 188/218 XL |
| 4,049,085 | 9/1977 | Blunier | 188/18 A |
| 4,930,606 | 6/1990 | Sporzynski et al. | 188/218 XL |
| 5,107,966 | 4/1992 | Metzler et al. | 188/218 XL |
| 5,109,960 | 5/1992 | Gunther | 188/218 XL |
| 5,358,080 | 10/1994 | Donabedian | 188/18 A |
| 5,385,216 | 1/1995 | Kulczycki | 188/218 XL |
| 5,407,035 | 4/1995 | Cole et al. | 188/218 XL |
| 5,460,249 | 10/1995 | Aoki | 188/218 XL |
| 5,509,510 | 4/1996 | Ihm | 188/218 XL |

FOREIGN PATENT DOCUMENTS

| | | | |
|---|---|---|---|
| 448101 | 4/1948 | Canada | 188/218 XL |
| 4003732 | 8/1991 | Germany | 188/218 XL |

*Primary Examiner*—Matthew C. Graham
*Assistant Examiner*—Melanie Talavera
*Attorney, Agent, or Firm*—Kalow & Springut

[57] ABSTRACT

A disc of a disc brake for vehicles in general and for high-performance cars in particular, which is of unusually low weight, comprises a hub and an annular brake member traversed by ventilation ducts extending between an internal annular face element and an external annular face element of the annular brake member interconnected by bridging columns, a projecting portion of the brake member being embedded in the hub during the manufacture of the hub by casting in a light alloy.

6 Claims, 1 Drawing Sheet

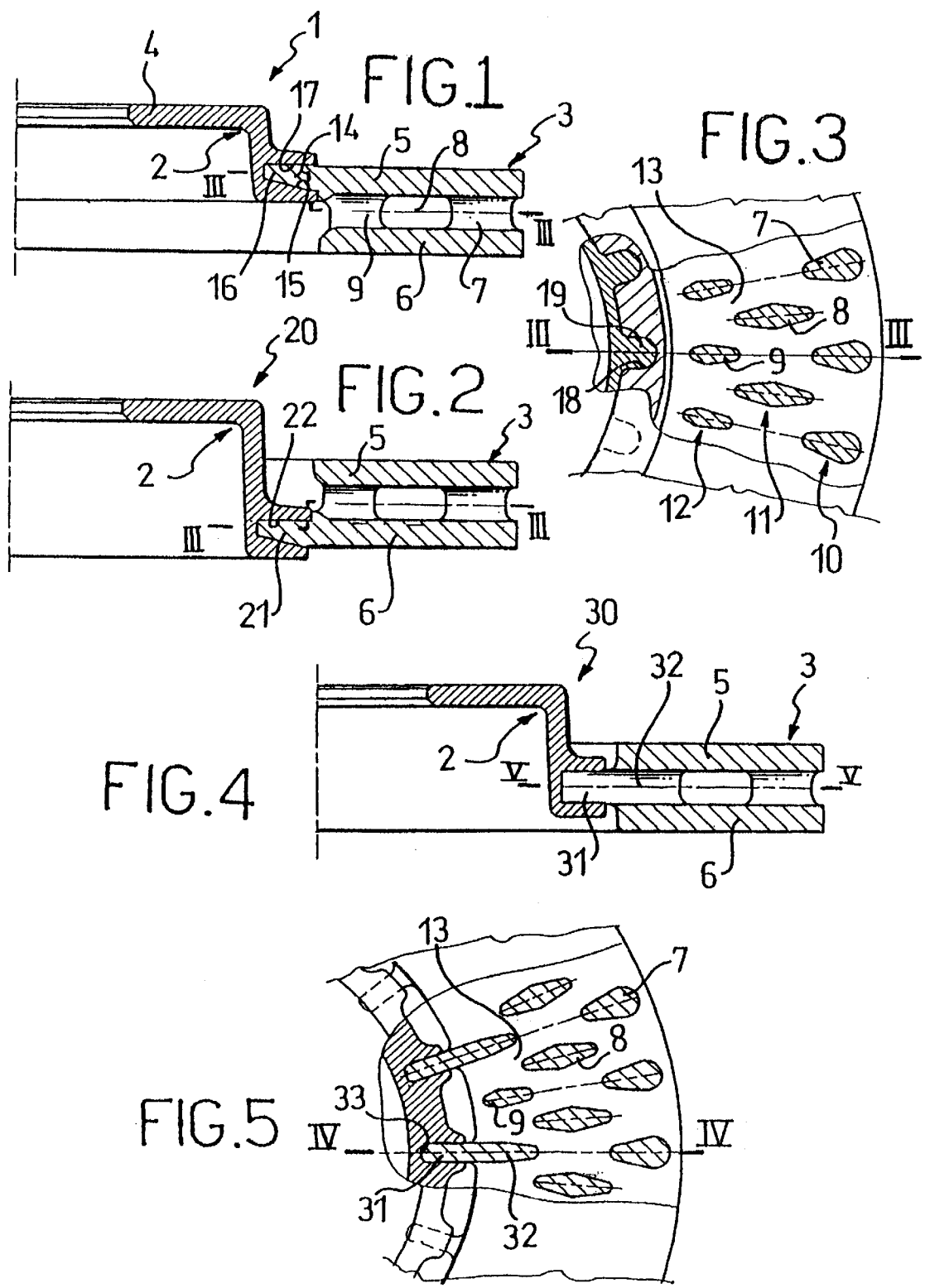

DISC FOR A DISC BRAKE FOR VEHICLES IN GENERAL AND FOR HIGH-PERFORMANCE CARS IN PARTICULAR

This is a continuation of application Ser. No. 08/320,953, filed Oct. 12, 1994 now abandoned.

FIELD OF THE INVENTION

The present invention relates to a disc of a disc brake for vehicles in general and for high-performance cars in particular, of the type comprising a hub and an annular brake member traversed by ventilation ducts extending between an internal annular face element and an external annular face element of the brake member interconnected by bridging columns.

BACKGROUND OF THE INVENTION

There has long been felt a need to reduce weight, particularly in high-performance cars.

In the case of grand touring cars, the incessant increase in the provision of accessories, from air-conditioners to motor drives for various controls, has made it necessary to search for new ways to reduce weight. In the case of racing cars, weight reductions are sought daily in order to achieve ever greater performance.

The object of the present invention is to provide a disc for a disc brake for vehicles in general, but for high-performance cars in particular, which has structural and functional characteristics such as to satisfy this requirement.

SUMMARY OF THE INVENTION

This object is achieved by a disc of the type specified which is characterised in that the annular brake member includes a projecting portion which is embedded in the hub during the manufacture of the hub by casting in light alloy.

BRIEF DESCRIPTION OF THE DRAWINGS

Further characteristics and advantages of the disc of the present invention will become apparent from the description below of a preferred embodiment, given by way of non-limitative example, with reference to the appended drawing, in which:

FIG. 1 is a sectional view of part of a disc according to the invention taken on the line I—I, FIG. 2 is a sectional view of part of another embodiment of the disc of the invention taken on the line II—II, FIG. 3 is a sectional view of the discs of FIG. 1 and FIG. 2 taken on the line III—III, FIG. 4 is a sectional view of part of a further embodiment of the disc of the invention taken on the line IV—IV, FIG. 5 is a sectional view of the disc of FIG. 4 taken on the line V—V.

DETAILED DESCRIPTION OF THE INVENTION

With reference to the appended drawings, there is generally indicated 1 a disc of a disc brake for vehicles in general and for high-performance cars in particular.

The disc 1 comprises a hub 2 and an annular brake member 3.

The hub 2 includes an attachment flange 4 for attaching the disc to a wheel hub.

The brake member 3 includes two annular face elements 5 and 6, an internal one 5 located on that side of the attachment flange 4 adjacent the hub 2 and an external one 6 located on the opposite.

The face elements 5 and 6 are interconnected by bridging columns 7, 8 and 9.

More particularly, the columns 7, 8 and 9 are arranged in respective circumferential rows 10, 11 and 12 respectively on the outer diameter, the median diameter and the inner diameter of the annular brake member.

The brake member 3 is thus traversed by ventilation ducts which extend radially and are defined between the face elements 5 and 6 and the columns 7, 8 and 9.

The hub 2 is cast from light alloy, for example aluminium alloy. The brake member 3 is made from cast iron.

The brake member 3 includes a projecting portion 14, which projects from its smaller diameter surface and is embedded in the hub 2 during the casting thereof so as to occupy a seat 15 in the hub itself.

More particularly (FIGS. 1 and 3), the projecting portion 14 is formed as a flange 16 which projects radially from the internal face element 5 and occupies an annular groove 17 in the hub formed during casting of the hub itself. Preferably the flange 16 is indented due to the presence of recesses 18, these recesses 18 being occupied by projecting parts 19 of the hub.

A disc 20 in accordance with another embodiment of the invention is described with reference to FIG. 2 and 3. Its parts which are structurally and functionally the same as those of the disc 1 are indicated by the same reference numbers and are not described below.

In the disc 20, the projecting portion 14 is formed as a flange 21 which projects radially from the external face element 6 and occupies an annular groove 22 in the hub formed during casting of the hub itself.

A disc 30 in accordance with a further embodiment of the invention is described with reference to FIGS. 4 and 5. Its parts which are structurally and functionally the same as those of the disc 1 are shown by the same reference numbers and are not described below.

In the disc 30, the projecting portion 14 is formed as a plurality of extensions 31 projecting radially from a corresponding plurality of columns 32 selected from the columns 9 in the row 12. In the example, only one out of every two columns 9 is extended to form the extensions 31. The extensions 31 occupy cavities 33 in the hub formed during casting of the hub itself.

The disc of the present invention has achieved the result of having an unusually low weight.

A further advantage thereof lies in the fact that it can be made by an unusually simple casting process even when the annular brake member is connected to the hub by the external face element.

A further advantage thereof lies in the fact that it can readily be made so that its overall dimensions are compact and such as not to exceed the dimensions of known discs so as to be completely interchangeable therewith.

Obviously a person skilled in the art may make numerous modifications and variations to the discs described above in order to satisfy particular and specific requirements, all of which fall within the scope of protection of the invention as defined in the following claims.

I claim:

1. A brake disc for vehicles comprising an annular brake member and a hub, said annular brake member being formed from cast iron material and comprising an internal annular face element, an external annular face element, bridging columns interconnecting said internal annular face element and said external annular face element, and ventilation ducts being defined between said internal annular face element and said external annular face element and transversing said annular brake member, said annular brake member further comprising a projecting portion extending from the internal annular face element, the external annular face element, or one or more bridging columns, said hub being formed of a light alloy material by casting and having an attaching portion, the projecting portion of said annular brake member being embedded in the attaching portion of the hub during the manufacture of said hub by casting.

2. A disc according to claim 1, wherein the projecting portion is formed as a flange projecting radially from the internal annular face element.

3. A disc according to claim 2, wherein the flange is indented.

4. A disc according to claim 1, wherein the projecting portion is formed as a flange projecting radially from the external annular face element.

5. A disc according to claim 4, wherein the flange is indented.

6. A disc according to claim 1, wherein the projecting portion is formed as a plurality of extensions projecting radially from a corresponding plurality of columns.

* * * * *